(12) United States Patent
Mehta

(10) Patent No.: US 9,187,627 B2
(45) Date of Patent: Nov. 17, 2015

(54) POLYETHYLENE HAVING FASTER CRYSTALLIZATION RATE AND IMPROVED ENVIRONMENTAL STRESS CRACKING RESISTANCE

(75) Inventor: Sameer D. Mehta, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 444 days.

(21) Appl. No.: 12/288,826

(22) Filed: Oct. 23, 2008

(65) Prior Publication Data

US 2010/0105839 A1    Apr. 29, 2010

(51) Int. Cl.
*C08L 23/00* (2006.01)
*C08L 23/06* (2006.01)
*C08L 23/08* (2006.01)

(52) U.S. Cl.
CPC ............. *C08L 23/06* (2013.01); *C08L 23/0815* (2013.01); *C08L 2205/03* (2013.01); *C08L 2205/24* (2013.01)

(58) Field of Classification Search
CPC .. C08L 23/06; C08L 23/0815; C08L 2205/03
USPC ........................................................ 525/240
See application file for complete search history.

(56) References Cited

U.S. PATENT DOCUMENTS

| | | | |
|---|---|---|---|
| 4,281,070 A * | 7/1981 | Scheetz et al. | 524/528 |
| 5,082,902 A * | 1/1992 | Gurevitch et al. | 525/240 |
| 5,530,055 A * | 6/1996 | Needham | 524/528 |
| 5,648,309 A | 7/1997 | Böhm | |
| 6,713,561 B1 * | 3/2004 | Berthold et al. | 525/191 |
| 6,809,154 B2 * | 10/2004 | Lindahl et al. | 525/191 |
| 6,969,741 B2 * | 11/2005 | Lustiger et al. | 525/240 |
| 7,074,949 B2 * | 7/2006 | Bos | 556/130 |
| 7,094,820 B2 | 8/2006 | Zhao et al. | |
| 7,144,939 B2 * | 12/2006 | Dotson et al. | 524/394 |
| 7,396,878 B2 * | 7/2008 | Lustiger et al. | 525/191 |
| 7,396,881 B2 * | 7/2008 | Lustiger et al. | 525/240 |
| 7,579,551 B2 | 8/2009 | Van Marion et al. | |
| 8,026,305 B2 * | 9/2011 | McLeod et al. | 524/396 |
| 2005/0004315 A1 * | 1/2005 | De Cambry De Baudimont et al. | 525/240 |
| 2005/0038157 A1 * | 2/2005 | Kochanowicz et al. | 524/284 |
| 2005/0255265 A1 * | 11/2005 | Gorgerin | 428/35.7 |
| 2006/0074194 A1 * | 4/2006 | Berthold et al. | 525/240 |
| 2007/0006733 A1 | 1/2007 | Stell et al. | |
| 2007/0037932 A1 * | 2/2007 | Ommundsen et al. | 525/240 |
| 2007/0066733 A1 * | 3/2007 | Hanssen et al. | 524/394 |
| 2007/0244233 A1 | 10/2007 | Hild et al. | |
| 2008/0033111 A1 | 2/2008 | Polosa | |
| 2008/0171834 A1 | 7/2008 | Tang et al. | |
| 2008/0199674 A1 * | 8/2008 | Berthold et al. | 428/220 |
| 2008/0269422 A1 * | 10/2008 | Svein et al. | 525/240 |
| 2008/0274353 A1 * | 11/2008 | Vogt et al. | 428/379 |

FOREIGN PATENT DOCUMENTS

| | | | |
|---|---|---|---|
| EA | 200702515 | | 6/2008 |
| WO | WO 2006/045550 | | 5/2006 |
| WO | WO 2007/003530 | | 1/2007 |
| WO | WO 2007003530 | * | 1/2007 |
| WO | WO 2007/033297 | | 3/2007 |
| WO | WO 2008/085250 | | 7/2008 |

OTHER PUBLICATIONS

ASTM D1693 flyer, 2013.*
H. N. Beck, *Heterogeneous Nucleating Agents for Polypropylene Crystallization,* Journal of Applied Polymer Science, vol. 11, pp. 673-685 (1967).

* cited by examiner

Primary Examiner — Irina Krylova

(57) ABSTRACT

Disclosed is a polyethylene composition having faster crystallization rate and improved environmental stress cracking resistance. The polyethylene composition comprises a multimodal polyethylene and a nucleating agent. The multimodal polyethylene comprises from 25 to 50 wt % of a low molecular weight ethylene homopolymer component, from 25 to 50 wt % of a medium molecular weight ethylene copolymer component and from 25 to 50 wt % of a high molecular weight ethylene copolymer component. The polyethylene composition has an environmental stress cracking resistance (ASTM D1693, Condition B in 100% Igepal) greater than or equal to 40 days and a crystallization half time less than or equal to 70% of the crystallization half time of the multimodal polyethylene without nucleating agent.

10 Claims, No Drawings

US 9,187,627 B2

POLYETHYLENE HAVING FASTER CRYSTALLIZATION RATE AND IMPROVED ENVIRONMENTAL STRESS CRACKING RESISTANCE

FIELD OF THE INVENTION

The invention relates to a polyethylene composition. More particularly, the invention relates to a multimodal polyethylene composition having improved environmental stress cracking resistance and faster crystallization rate.

BACKGROUND OF THE INVENTION

Beverage bottle caps are made of two pieces. The hard outer piece is made from polypropylene. The inner liner is made from ethylene-vinyl acetate copolymer (EVA). Polypropylene is not used for the inner liner because processing polypropylene needs a high level of processing additives. The processing additives may leach out into the beverage contained in the beverage bottle and thus contaminate the beverage. EVA has excellent sealing ability and organoleptic properties, but it is expensive. Two-pieces caps, while satisfying the physical and organoleptic requirements for beverage bottles, are expensive and difficult to process because of the relatively high cost of EVA and the complication of the multi-piece fabrication.

Single-piece beverage bottle caps are known. For instance, U.S. Pat. Appl. Pub. No. 2008/0033111 discloses single-piece beverage bottle caps made from a polyethylene blend which comprise a first polyethylene and optionally a second polyethylene. The first polyethylene has a multimodal molecular weight distribution such that the ratio of weight average molecular weight of the polymer to the number average molecular weight of the polymer is at least about 12. Single-piece bottle caps are advantageous over two-piece bottle caps because they are simple to make and easy to use. The production rate of single-piece polyethylene caps is largely controlled by the crystallization rate of polyethylene.

Furthermore, most beverages, such as fruit juices, sweetened teas, carbonated beverages, and milk, are acidic. Polymers for making beverage bottle caps thus require acid resistance which can be measured by the environmental stress cracking resistance (ESCR). The polyethylene cap disclosed by U.S. Pat. Appl. Pub. No. 2008/0033111 has relatively low ESCR.

A new polyethylene composition is needed. Ideally, the polyethylene composition would have both improved ESCR and faster crystallization rate.

SUMMARY OF THE INVENTION

The invention is a polyethylene composition having faster crystallization rate and improved environmental stress cracking resistance (ESCR). The polyethylene composition comprises a multimodal polyethylene and a nucleating agent, wherein the multimodal polyethylene comprises from 25 to 50 wt % of a low molecular weight ethylene homopolymer component, from 25 to 50 wt % of a medium molecular weight ethylene copolymer component and from 25 to 50 wt % of a high molecular weight ethylene copolymer component. The polyethylene composition has an environmental stress cracking resistance (ASTM D1693, Condition B in 100% Igepal) greater than or equal to 40 days and a crystallization half time less than or equal to 70% of the crystallization half time of the multimodal polyethylene without the nucleating agent. By "low", "medium", and "high", I mean that the high molecular weight ethylene copolymer component has a higher weight average molecular weight than the medium molecular weight ethylene copolymer, and the medium molecular weight ethylene copolymer has a higher weight average molecular weight than the low molecular weight ethylene homopolymer.

DETAILED DESCRIPTION OF THE INVENTION

The polyethylene composition of the invention comprises a multimodal polyethylene and a nucleating agent. Suitable multimodal polyethylene comprises from 20 to 40 wt % of a low molecular weight ethylene homopolymer component, from 20 to 40 wt % of a medium molecular weight ethylene copolymer component and from 20 to 40 wt % of a high molecular weight ethylene copolymer component. More preferably, the multimodal polyethylene comprises from 30 to 40 wt % of a low molecular weight, ethylene homopolymer component, from 30 to 40 wt % of a medium molecular weight, ethylene copolymer component and from 20 to 30 wt % of a high molecular weight, ethylene copolymer component.

Preferably, the low molecular weight, ethylene homopolymer component has a density greater than 0.965 g/cm$^3$ and a melt index MI$_2$ within the range of 50 dg/min to 250 dg/min, the medium molecular weight, ethylene copolymer component has a density within the range of 0.945 g/cm$^3$ to 0.962 g/cm$^3$ and a melt index MI$_2$ within the range of 1 dg/min to 50 dg/min, and the high molecular weight, ethylene copolymer component has a density within the range of 0.855 g/cm$^3$ to 0.949 g/cm$^3$ and a melt index MI$_2$ within the range of 0.001 dg/min to 0.3 dg/min.

More preferably, the low molecular weight, ethylene homopolymer component has a density within the range of 0.965 g/cm$^3$ to 0.973 g/cm$^3$ and a melt index MI$_2$ within the range of 100 dg/min to 250 dg/min, the medium molecular weight, ethylene copolymer component has a density within the range of 0.950 g/cm$^3$ to 0.962 g/cm$^3$ and a melt index MI$_2$ within the range of 10 dg/min to 30 dg/min, and the high molecular weight, ethylene copolymer component has a density within the range of 0.905 g/cm$^3$ to 0.935 g/cm$^3$ and a melt index MI$_2$ within the range of 0.01 dg/min to 0.1 dg/min.

Preferably, the multimodal polyethylene has a density within the range of 0.942 g/cm$^3$ to 0.959 g/cm$^3$. More preferably, the multimodal polyethylene has a density within the range of 0.945 g/cm$^3$ to 0.958 g/cm$^3$. Most preferably, the multimodal polyethylene has a density within the range of 0.948 g/cm$^3$ to 0.957 g/cm$^3$.

Preferably, the multimodal polyethylene has a melt index MI$_2$ within the range of 0.2 dg/min to 30 dg/min. More preferably, the multimodal polyethylene has a melt index MI$_2$ within the range of 0.5 dg/min to 15 dg/min. Most preferably, the multimodal polyethylene has a melt index MI$_2$ within the range of 1 dg/min to 3 dg/min.

Suitable comonomers for making the medium molecular weight, ethylene copolymers and high molecular weight, ethylene copolymers are preferably selected from C$_3$-C$_{10}$ α-olefins, for example, propylene, 1-butene, 1-pentene, 1-hexene, 1-octene, 4-methyl-1-pentene, the like, and mixtures thereof.

Methods for making multimodal polyethylene are known. For instance, WO 2007/003530 teaches how to make a multimodal polyethylene. For instance, a trimodal polyethylene is preferably prepared in a continuous process with three reactors in series. An ethylene homopolymer component is made by slurry polymerization in a first reactor in the presence of a Ziegler catalyst, a solvent, and hydrogen. Suitable Ziegler catalysts include those known in the industry. See, WO 91/18934. An example of a suitable Ziegler catalyst is titanium tetrachloride with triethylaluminum cocatalyst. The Ziegler catalyst is preferably suspended in a solvent. Preferred solvents are selected from $C_5$-$C_{12}$ alkanes and cycloalkanes, including hexane, cyclohexane, octane, the like, and mixtures thereof. Ethylene is preferably continuously fed into the catalyst slurry in the first reactor. The molecular weight or melt index $MI_2$ of the low molecular weight ethylene homopolymer component is controlled by the hydrogen concentration. Preferably, the hydrogen/ethylene ratio in the gas phase is within the range of 9/1 to 1/9 by volume; more preferably, the hydrogen/ethylene ratio in the gas phase is within the range of 1/1 to 5/1 by volume.

The polymer slurry from the first reactor is preferably transferred to a second reactor. The polymer slurry is degassed to remove some of the hydrogen from the first reactor. Ethylene and α-olefin are fed to the second reactor and copolymerized to form a medium molecular weight, ethylene copolymer component. The ratio of α-olefin/ethylene depends on the desired density of the medium molecular weight, ethylene copolymer component. The more α-olefin is used, the lower density polymer is produced. The feed ratio of α-olefin/ethylene is preferably within the range of 0.01 to 0.05 by weight.

The polymer slurry from the second reactor is preferably transferred to a third reactor. The slurry is further degassed to remove hydrogen. Preferably, the third reactor is essentially hydrogen free. Ethylene and α-olefin are fed to the third reactor and copolymerized to form a high molecular weight, ethylene copolymer component. The feed ratio of α-olefin/ethylene is preferably within the range of 0.05 to 0.2 by weight and more preferably from 0.1 to 0.2 by weight.

The polymerization temperatures in the reactors can be the same or different. Preferably, the polymerization temperature is within the range of 50° C. to 150° C., more preferably within the range of 50° C. to 100° C.

The slurry from the third reactor is flashed and dried to remove the solvent and residual monomers. The resultant multimodal polyethylene powder is preferably pelletized.

Suitable nucleating agents include those known to the industry. See, for example, U.S. Pat. Nos. 7,074,949, 7,094,820, and 7,144,939. See also Journal of Applied Polymer Science, Vol. 11, pp. 673-685 (1967). Suitable nucleating agents are preferably selected from zinc glycerolate, calcium glycerolate, calcium hexahydrophthalate, zinc hexahydrophthalate, the like, and mixtures thereof. More preferably, the nucleating agent is selected from the group consisting of zinc glycerolate, calcium hexahydrophthalate, the like, and mixtures thereof. Both zinc glycerolate and calcium hexahydrophthalate are relatively new nucleating agents and commercially available. For instance, zinc glycerolate is available from Ciba Specialty Chemicals as Irgastab® 287. Calcium hexahydrophthalate is available from Milliken and Company as Hyperform® HPN-20E.

The amount of nucleating agent used varies depending on many factors such as the nucleating agent type, the properties of the multimodal polyethylene, the targeted improvement of the crystallization rate. Preferably, the nucleating agent is used in an amount within the range of about 10 ppm to 10,000 ppm based on the total polyethylene composition. More preferably, the nucleating agent is used in an amount within the range of 20 ppm to 5,000 ppm based on the total polyethylene composition. Most preferably, the nucleating agent is used in an amount within the range of 50 ppm to 1,000 ppm based on the total polyethylene composition.

The nucleating agent and the multimodal polyethylene can be blended thermally, in solution, or by any other suitable techniques. Preferably, the nucleating agent and the multimodal polyethylene are thermally blended in a mixer or extruder.

Optionally, the polyethylene composition contains antioxidants, UV-absorbents, flow agents, or other additives. These additives are well known in the art. The additives are added in an amount preferably less than 10 wt % of the total polyethylene composition.

The polyethylene composition of the invention has an environmental stress cracking resistance (ESCR, ASTM D1693, Condition B in 100% Igepal) greater than or equal to 40 days and a crystallization half time less than or equal to 70% of the crystallization half time of the multimodal polyethylene without the nucleating agent. The polyethylene composition preferably has a crystallization half time less than or equal to 60% of the crystallization half time of the multimodal polyethylene. Preferably, the polyethylene composition has a crystallization half time less than or equal to 50% of the crystallization half time of the multimodal polyethylene. Preferably, the polyethylene composition has a crystallization half time less than or equal to 12 minutes at 124° C. More preferably, the polyethylene composition has a crystallization half time less than or equal to 9 minutes at 124° C. Most preferably, the polyethylene composition has a crystallization half time less than or equal to 6 minutes at 124° C.

The polyethylene composition of the invention has many applications. It is particularly useful for making beverage bottle caps. It is more particularly useful for making single-piece beverage bottle caps because of its improved ESCR and faster crystallization rate.

The following examples merely illustrate the invention. Those skilled in the art will recognize many variations that are within the spirit of the invention and scope of the claims.

EXAMPLES 1-5

A trimodal polyethylene is prepared following the general procedure disclosed in Example 1 of WO 2007/003530 A1. The trimodal polyethylene contains 36 wt % of a low molecular weight, ethylene homopolymer component which has a density of 0.970 g/cm$^3$ measured according to ASTM D1505 and melt index $MI_2$ of 170 dg/min measured according to ASTM D1238, 36 wt % of a medium molecular weight, ethylene-1-butene copolymer component which has a density of 0.958 g/cm$^3$ and $MI_2$ of 27 dg/min, and 28 wt % of an high molecular weight, ethylene-1-butene copolymer component which has a density of 0.926 g/cm$^3$ and an $MI_2$ of 0.047 dg/min. The powder is then stabilized with additives including anti-oxidants and acid scavengers and pelletized in an extruder. The pelletized trimodal polyethylene has a density of 0.954 g/cm$^3$ and $MI_2$ of 1.53 dg/min.

In order to facilitate good dispersion of the nucleating agent into the trimiodal polyethylene, the polyethylene pellets are ground to approximately 15 mesh powder on a one mill Orenda Grinder. During the grinding operation, the temperature of the mill housing is set at 90° C.

The trimodal polyethylene powder is mixed with calcium hexahydrophthalate (Hyperform® HPN-20E, product of Milliken and Company) in an amount of 100 ppm, 200 ppm, 300 ppm, 400 ppm, and 500 ppm respectively in Examples 1 through 5, based on the total composition. The mixtures are extruded in a Killion single extruder at a speed of 70 rpm and temperatures of 350° F., 375° F., 400° F., and 425° F., respectively, in Zone 1, Zone 2, Zone 3 and the die. The samples are tested for ESCR according to ASTM D 1693 condition B, in 100% Igepal. The crystallization half time at 124° C. was measured on a TA Q1000 machine. The sample is heated to 160° C. at 10° C./min and held at 160° C. for 5 min. Then it is cooled to 124° C. at 60° C./min. and held at 124° C. for 30 min. The results are listed in Table 1.

COMPARATIVE EXAMPLE 6

Example 1 is repeated but no nucleating agent is used. Comparing with Examples 1-5 above, addition of nucleating agent to the trimodal polyethylene significantly shortens the crystallization half time, i.e., faster crystallization rate, while maintaining the ESCR value of the trimodal polyethylene.

COMPARATIVE EXAMPLES 7-12

Comparative Examples 7-11 follows Examples 1-5 and Comparative Example 12 follows Comparative Example 6 except that a bimodal polyethylene, rather than the trimodal polyethylene, is used in Comparative Examples 7-12. The bimodal polyethylene (L5355, a product of Equistar Chemicals) has a density of 0.953 g/cm³ and $MI_2$ of 0.42 dg/min. The results are listed in Table 1. The results in Table 1 indicate that the addition of nucleating agent has a significantly greater effect on increasing the crystallization rate of the trimodal polyethylene than that of the bimodal polyethylene. The results in Table 1 also indicate that the trimodal polyethylene has significantly greater ESCR than the bimodal polyethylene.

TABLE 1

CRYSTALLIZATION HALF TIME AND ESCR VALUES OF POLYETHYLENE COMPOSITIONS

| Ex. No. | Polyethylene | Amount of Nucleating Agent (ppm) | Crystallization Half time at 124° C. (min) | ESCR (days) |
| --- | --- | --- | --- | --- |
| 1 | Trimodal | 100 | 6.4 | >42 |
| 2 | Trimodal | 200 | 5.4 | >42 |
| 3 | Trimodal | 300 | 4.9 | >42 |
| 4 | Trimodal | 400 | 4.6 | >42 |
| 5 | Trimodal | 500 | 4.3 | >42 |
| C6 | Trimodal | 0 | 17.4 | >42 |
| C7 | Bimodal | 100 | 5.4 | 7.8 |
| C8 | Bimodal | 200 | 5.3 | 6.3 |
| C9 | Bimodal | 300 | 5.1 | 6.6 |
| C10 | Bimodal | 400 | 5.0 | 6.4 |
| C11 | Bimodal | 500 | 4.8 | 6.8 |
| C12 | Bimodal | 0 | 6.6 | 6.4 |

I claim:

1. A multimodal polyethylene composition comprising:
   (a) from 20 ppm to 5,0000 ppm a nucleating agent selected from the group consisting of zinc glycerolate, calcium glycerolate, calcium hexahydrophthalate, zinc hexahydrophthlate, and mixtures thereof;
   (b) from 25 to 50 wt % of a first ethylene homopolymer component which has a density within the range of 0.965 g/cm³ to 0.973 g/cm³;
   (c) from 25 to 50 wt % of a second ethylene copolymer component which has a density within the range of 0.950 g/cm³ to 0.962 g/cm³; and,
   (d) from 25 to 50 wt % of a third ethylene copolymer component which has a density within the range of 0.905 g/cm³ to 0.935 g/cm³,
   wherein the multimodal polyethylene composition has a density from of 0.942 g/cm³ to 0.959 g/cm³, a $MI_2$ from 0.2 dg/min to 30 dg/min, a crystallization half time less than or equal to 12 minutes at 124° C., and has an environmental stress cracking resistance of greater than or equal to 40 days, measured according to ASTM D 1693 condition B, in 100% Igepal,
   wherein the multimodal polyethylene composition has a crystallization half time less than or equal to 70% of the crystallization half time of the multimodal polyethylene without the nucleating agent, and
   wherein the first ethylene homopolymer component has a melt index $MI_2$ within the range of 50 dg/min to 250 dg/min, the second ethylene copolymer component has a melt index $MI_2$ within the range of 10 dg/min to 30 dg/min, and the third ethylene copolymer component has a melt index $MI_2$ within the range of 0.001 dg/min to 0.3 dg/min.

2. The multimodal polyethylene composition of claim 1, wherein the multimodal polyethylene composition has of a crystallization half time less than or equal to 60% of the crystallization halftime of the multimodal polyethylene.

3. The multimodal polyethylene composition of claim 1, wherein the multimodal polyethylene composition has a crystallization half time less than or equal to 50% of the crystallization half time of the multimodal polyethylene.

4. The multimodal polyethylene composition of claim 1, wherein the multimodal polyethylene composition has a crystallization half time less than or equal to 9 minutes at 124° C.

5. The multimodal polyethylene composition of claim 1, wherein the multimodal polyethylene composition has a crystallization half time less than or equal to 6 minutes at 124° C.

6. The multimodal polyethylene composition of claim 1, wherein the multimodal polyethylene composition comprises from 50 ppm to 1,000 ppm of the nucleating agent.

7. The multimodal polyethylene composition of claim 1, wherein the multimodal polyethylene composition has a $MI_2$ from 0.5 dg/min to 15 dg/min.

8. The multimodal polyethylene composition of claim 1, wherein the first ethylene homopolymer component has a melt index $MI_2$ within the range of 100 dg/min to 250 dg/min; and,
   the third ethylene copolymer component has a melt index $MI_2$ within the range of 0.01 dg/min to 0.1 dg/min.

9. The multimodal polyethylene composition of claim 1, wherein the multimodal polyethylene composition comprises from 100 to 500 ppm of the nucleating agent.

10. The multimodal polyethylene composition of claim 1, wherein the nucleating agent is calcium hexahydrophthalate.

* * * * *